April 7, 1942.  F. A. NIEMANN  2,279,054
CALCULATING MACHINE
Filed April 27, 1938  5 Sheets-Sheet 3

INVENTOR.
Frederick A. Niemann
BY Charles B. Rasmussen
ATTORNEY.

INVENTOR.
Frederick A. Niemann
BY Charles B. Rasmussen
ATTORNEY.

April 7, 1942.  F. A. NIEMANN  2,279,054
CALCULATING MACHINE
Filed April 27, 1938  5 Sheets-Sheet 5

INVENTOR.
Frederick A. Niemann
BY Charles D. Gormsen
ATTORNEY.

Patented Apr. 7, 1942

2,279,054

UNITED STATES PATENT OFFICE 2,279,054

CALCULATING MACHINE

Frederick A. Niemann, Chicago, Ill., assignor to Felt & Tarrant Mfg. Co., Chicago, Ill., a corporation of Illinois Application April 27, 1938, Serial No. 204,707

3 Claims. (Cl. 235—82)

This invention relates in general to calculating machines, and has for its principal object the provision of an improved mechanism for lightening the key stroke in a key-driven calculating machine.

The invention is particularly applicable for use in connection with calculating machines of the key-driven multiple-order type, although not necessarily restricted thereto, and, in the present embodiment, is illustrated in a machine of the general type of the well-known "duplex Comptometer," which is exemplified in the United States patents to Dorr E. Felt, No. 762,520, dated June 29, 1904; to Kurt F. Ziehm, No. 1,110,734, dated September 15, 1914; and to Joseph A. V. Turck, No. 1,357,747 and No. 1,357,748, dated November 2, 1920; No. 1,449,639, dated March 27, 1923; and No. 2,020,975, dated November 12, 1935.

Heretofore, in the operation of key-driven calculating machines, the key-stroke has required a decided amount of effort to be expended on the part of the operator, even though the key-stroke has been lightened immeasurably. With the improvements embodied in the present invention, the key-stroke has been lightened a great deal more and the speed of operation has been increased.

Another important object of the invention is the provision of certain improvements in the type of machine illustrated in the above mentioned patents that will increase the life and durability of the moving parts, as well as reduce the amount of noise attendant with their operation.

More specifically, the instant invention contemplates the use of light weight material, such as aluminum, or other suitable light weight material, instead of steel, for the segment levers, key lock levers and stop levers; which is made possible by the provision of supplemental stationary stop members for limiting the downward movement of the keys so as to relieve the other moving parts of the wear and strain resulting from stopping their movements abruptly and for effectively absorbing the power initially imparted thereto to attain the desired speed of operation which exceeds the minimum power required to effect an operation. To further lighten the key stroke and increase the speed of operation of the machine, the hub portion of the lantern wheel and the gear secured thereto in each denominational lantern wheel assemblage of the accumulator are also made of a suitable light weight material, such as aluminum, and each of these assemblages, which include a pinion in mesh with the segment lever and a ratchet mechanism interposed between the pinion and the lantern wheel, is provided with an improved bearing which will be more fully described hereinafter. The carrying motor springs employed in the accumulator are formed in a manner different from that disclosed in the above cited patents to make their operation uniform regardless of the varying digital degree of rotation imparted to their ends, which are anchored to the winding gears, during actuation of the accumulator. This results in further lightening of the key stroke and smoother operation of the machine.

The application of power to the keys of a calculating machine of the type set forth is for the sole purpose of turning a numeral wheel in the denominational order in which the key is depressed and storing up power in the next higher order for the turning of that numeral wheel in the carrying of the tens. It is well known that in so doing, certain amount of inertia must be overcome, which varies with the type of machine used. In the older key driven type above set forth it formerly required 16 ounces of pressure to operate the number 7 key. The use of the light weight material and other means described in this application, however, has allowed of lessening by half the amount of pressure required to perform the same work in the older type of machine. It is also recognized that the exertion of effort in performing mechanical calculation sets up momentum in the mechanism employed which, in turn, must be overcome in controlling against errors in the calculation by instantaneously stopping the very rapidly moving parts. The use of the light weight material and other means for lightening the machine operation set forth herein serves to facilitate the overcoming of such momentum and stoppage of the parts with a minimum of wear and strain thereon, in addition to overcoming the inertia heretofore referred to.

Numerous other objects and advantages of the invention will be apparent as it is better understood from the following description, which, when taken in connection with the accompanying drawings, disclosed a preferred embodiment thereof.

In its present embodiment, the invention is incorporated in a calculating machine of the multiple-order key-driven type, such as the well-known "Comptometer" disclosed in the United States Letters Patent above referred to. As the details of construction of this type of machine may be readily understood from these earlier patents, a brief description here of the general features thereof and such parts as are directly concerned with the operation of the present improvements is thought to be sufficient for an understanding of this invention.

Referring more particularly to the drawings, reference numeral 10 indicates in general a casing having a base 11. A frame mounted on the base 11 consists essentially of side skeleton plates 12 and intermediate skeleton plates 13 disposed between the various denominational actuating mechanisms of the several orders of the machine, and all are held together at suitable points by transverse tie rods 14. A number of columns of nine keys each are provided in the casing 10, each key being indicated by the reference numeral 15, there being a column of nine keys for each numeral wheel that is a duplicate of the other columns, together with the actuating mechanisms and attendant parts interposed between a column of keys and its corresponding numeral wheel. Each column of keys 15 forms a part of the actuating mechanism for the accumulator for transmitting variable digital amounts to its associated numeral wheel in accordance with the particular key depressed. In each denominational order, the actuating mechanism includes a column actuator in the form of a segment lever 16 pivoted at 17 at the rear of the machine which is adapted to be depressed in different amounts determined by the particular key 15 actuated by the operator.

Means are provided to facilitate easy removal of the actuating mechanism from the casing 10. Fastened to the top plate 101 of the casing 10, in any suitable manner as by means of spot welding or the like, are a plurality of auxiliary strip members 102. Extending downwardly from each strip member 102 are small protuberances or lip members 103 which rest adjacent the skeleton plates 12 and the intermediate plates 13. Small apertures are formed in the lip member 103 which correspond with like apertures in the plates 12 and 13 and are held in place by means of a small rod 104 which holds the top plates 101 securely in place.

The skeleton plates 12 have foot portions 105 extending downwardly and which rest upon short extensions 106 formed in the base 11 and are held in place by means of screws 107 or the like. It will be apparent that when it is desired to remove the actuating mechanism from the casing 10 it is only necessary to remove the screws 106 from the leg portions 105 and lift the entire mechanism out so that any minor adjustments may be made and corrected.

A layer of sound deadening material 108 is positioned adjacent the base 11, side and end walls and top plate 101, to eliminate any noise that might occur within the casing 10. The material 108 is held in place adjacent the under surface of the top plate by means of holding means 109, which are formed integrally with the strip members 102, and a secondary holding means 111 which comprises a small threaded member 112 fastened to the top plate 101 in any suitable manner and a holding member 113 which is held in place by means of a nut 114. By tightening the nut 114 against the holding member 113, the sound deadening material is securely held in place at all times.

The cancelling-actuator handle 115 is in operation similar to the cancelling-actuator handle disclosed in the United States Letters Patent above referred to. The handle 115, however, is not positioned on the outside of the casing 10 as shown in the foregoing patents but has been so altered in shape so it may be incorporated within the casing. The handle 115 has a flattened recess portion 116 which is adapted to receive the finger of the operator. Also the handle has an elongated portion 117 which fits in a suitable slot or aperture in the top portion 101 so that regardless of the position occupied by the handle 115 in the opening in the casing 10, it will always be closed and thereby prevent any dirt or foreign matter from falling into the interior of the casing.

Each key 15 is provided with a stem 18 extending downwardly in a position to co-operate with its associated segment lever 16. The key 15 at the extreme right (viewing Figs. 2 and 3), which is at the front of the machine, being farther from the pivotal axis 17 of the segment lever 16 than the key at the extreme left, moves the segment lever 16 through a lesser arc than does the key last mentioned. The keys of each column are numbered from "1" to "9" from front-to-rear of the machine. The key at the extreme front is adapted to effect operation of the segment lever 16 through an arc substantially one-ninth of that produced by the operation of the key at the extreme rear of the machine, and, upon depression of intermediately positioned keys, the segment lever 16 is moved through arcs proportionate with the value of the intermediate key actuated.

The segment lever 16 of each order or column of nine keys is adapted to impart calculating movement to an accumulator, and, for such purpose, is provided at its forward end with a rack 19 which meshes with an accumulator pinion 20 (Fig. 12), journaled on a transverse shaft 21 that extends across the machine and is supported in suitable bearings in the skeleton frame 13.

Figure 1:
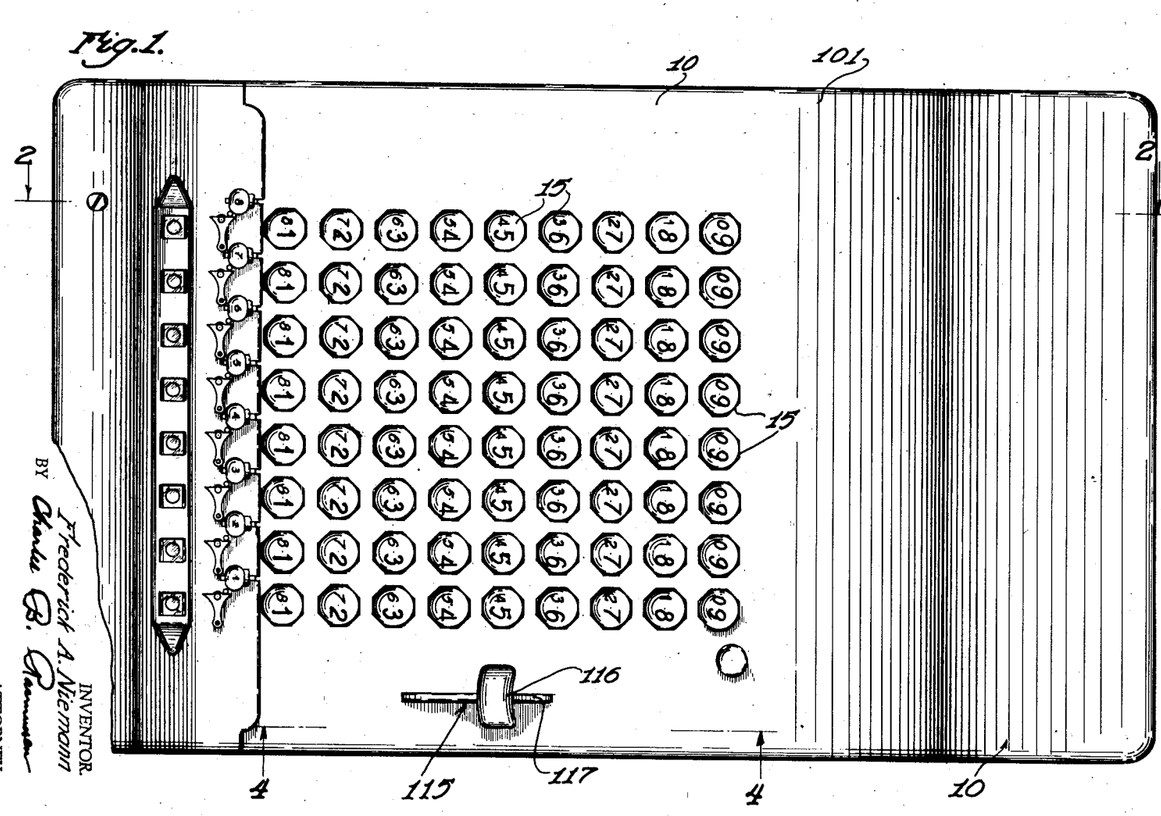
Fig. 1 is a top plan view of a calculating machine of the multiple-order key-driven type, in which the present improvements are embodied.
Figure 2:
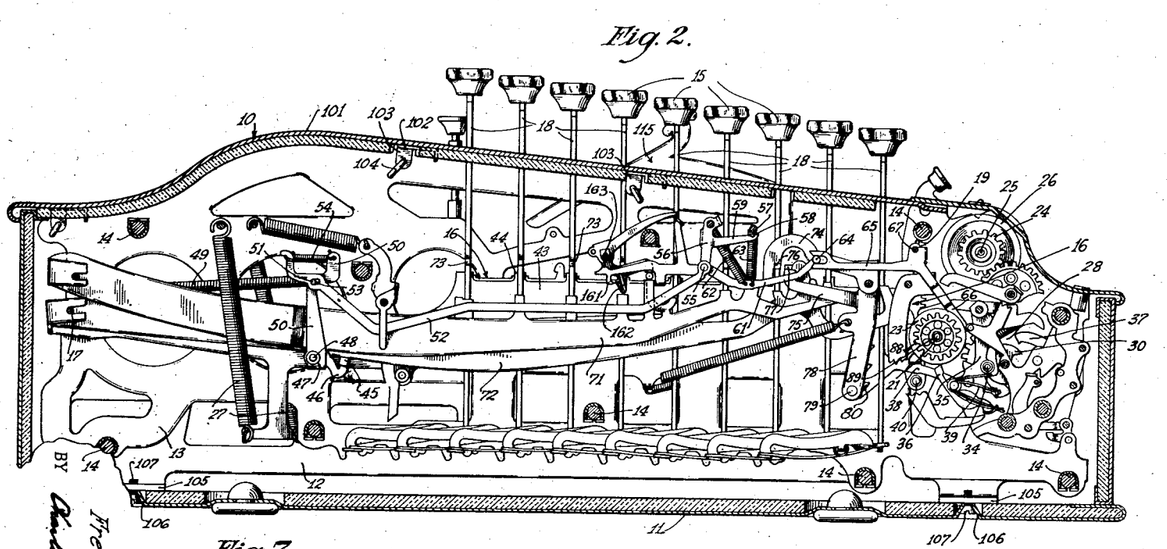
Fig. 2 is a vertical sectional view of the improved calculating machine taken substantially on the line 2—2 in Fig. 1.

The accumulator pinion 20 of each denominational order forms a part of an internal ratchet mechanism 22 (Fig. 12) which becomes effective on the upstroke of the segment lever 16, as is fully described in the hereinbefore mentioned patents, to clutch the pinion 20 to a lantern wheel 23 which is normally connected by a suitable train of gearing with a numeral wheel pinion 24. The numeral wheel pinion 24 is journaled on a transverse shaft 25 and is fixed to the numeral or registering wheel 26. Whenever the segment lever 16 is depressed, the ratchet mechanism 22 moves idly and no motion is transmitted to the lantern gear 23 and the numeral wheel 26. However, upon the return or upward movement of the segment lever 16, the lantern gear 23 is clutched to the accumulator pinion 20 and the numeral wheel 26 is rotated through an arc determined by the particular key of the corresponding denominational order that is actuated. The segment lever 16 is moved upwardly, on release of the actuated key, by a segment lever spring 27 (Fig. 2).

Figure 9:
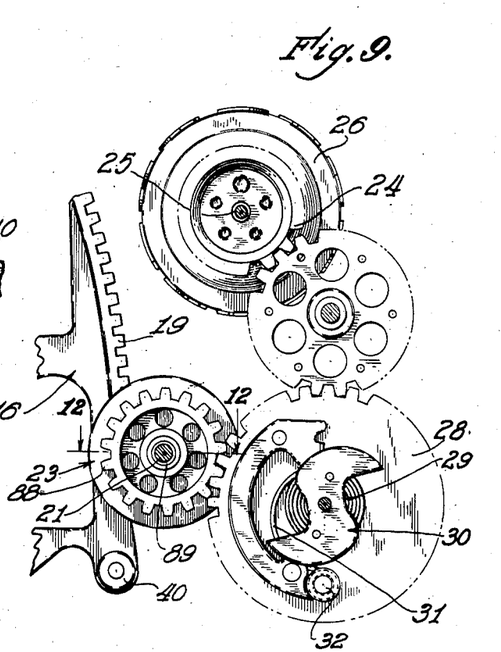
Fig. 9 is an enlarged detail elevational view of the accumulator mechanism.
Figure 10:
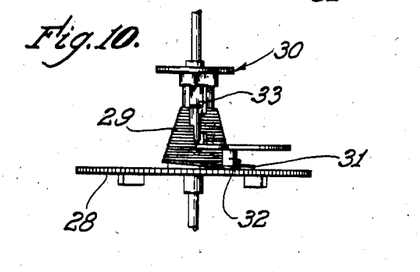
Fig. 10 is a bottom plan view of one of the winding gears and the carry mechanism associated therewith.

Carrying mechanism is co-operatively combined with each denominational order of the accumulator for the purpose of actuating the numeral wheel of the next higher order whenever a carry is to go over from a lower order. The ratio of the several gears and various parts is such that a complete rotation of the numeral wheel 26 is accompanied by a half rotation of a gear 28 (Figs. 2 and 9) forming a part of the gear train referred to, so that, at each half rotation of said gear 28, it is essential that a carry go over to the next higher order. In addition to its function as a member of the denominational gear train for transmitting the motion of the segment lever 16 to the numeral wheel 26, the gear 28 operates as a carrying motor spring winding gear and, for this purpose, the gear 28 is secured to one end of a carrying motor spring 29 (Figs. 9 and 10).

Each of the carrying motor springs 29 is wound spirally into a conical frustum with its smaller loop secured to a carrying-escapement member 30. At its larger end, the carrying spring is provided with an enlarged loop or curl 31 which terminates in a small curl or loop which embraces a stud 32 secured to the gear 28 (Fig. 9). As the gear 28 is actuated, the spring 29 is wound up, and the enlarged loop 31 equalizes the tension throughout the entire spring. Less power is required, therefore, for the purpose of winding it, and the segment lever spring 27 is much lighter in construction than the springs heretofore used and a much lighter key stroke results.

The carrying-escapement member 30 has a stop 33, of well-known construction, which is adapted to be engaged by first one and then the other of a pair of releasing-detents (not shown but of the type shown and described in the prior United States patents referred to), so that, whenever said stop is released by one of the detents, the escapement member 30 can make only one-half of a complete revolution before being checked in its movement by the engagement of the stop 33 with the other of the detents. Each such half-rotation of the escapement member 30 gives a corresponding half-rotation to a carrying cam member that is a unitary part of the escapement member 30.

The carrying cam member is of the type shown and described in the prior United States patents referred to, and consists essentially of a pair of oppositely disposed cam arms against which a dolly roll 34 (Fig. 2) of a bell crank carrying lever 35 rides during the carrying throws imparted to such lever by such cams. Each 180 degree throw of one of the carrying cams lifts the bell crank carrying lever 35 sufficiently to cause the usual carrying pawl 36 (that is pivotally mounted at the rear end of such lever) to move the lantern wheel 23 of the next higher or left hand denominational order one numeral space, which movement of the lantern wheel 23 is transmitted through the hereinbefore mentioned gear train to the next higher numeral wheel 26 to effect the desired transfer operation. The release of the escapement member 30 from first one and then the other of its detents is effected by the usual dolly roll (shown and described in the hereinbefore mentioned United States patents), which is mounted on the far side of the carrying motor winding gear 28 and is adapted to ride under a cam-faced ear 37 projecting laterally from each detent when the winding gear 28 rotates into proper angular relation with the detent to be released. In this manner, it is provided that, while the winding gear 28 may by a full rotation wind into the carrying motor spring 29 sufficient power to effect two carrying throws of the carrying cam member, the alternate engagement and releasing of the escapement member 30 by first one and then the other of the pair of opposed linked releasing detents (one or the other being always in the path of the stop 33 of said escapement member 30) restricts each throw of such escapement member to a half-rotation of the winding gear 28, thereby releasing only one carrying impulse at a time.

In order to prevent either carrying cam of any carrying cam member from effecting a carrying throw of the co-operating carrying lever at a time when the accumulator of the higher order impelled by said carrying lever is already in motion or is about to be moved by the segment lever 16 that has been or is being depressed by one of the keys 15 in that higher order, there is provided a detaining latch tooth formed on the front end of a stop detent 38 in said higher order. The stop detent 38 is pivotally mounted on the carrying bell crank lever 35 and is adapted to be actuated by a spring 39 to shift said detaining latch tooth into restraining engagement with one or the other of the pair of stops 33 carried by the escapement member 30. Normally, the retaining latch tooth of the detent 38 is held out of engagement with a stop of the escapement member 30 by a dolly roll 40 (Figs. 2 and 9) carried by the segment lever of the next higher order. On depression of such segment lever, however, the dolly roll 40 moves out of engagement with the stop detent 38, thereby permitting the spring 39 to shift said stop detent 38 into such position that the detaining latch tooth is engaged with one of the stops of the escapement member 30, and this relation of the parts continues until the segment lever 16 moves to its normal elevated position.

The carrying escapement member 30 is caught by the detaining latch tooth of the detent 38 just after it has escaped one or the other of the escapement detents just sufficiently to prevent re-engagement with said escapement detents, but not enough to permit movement of the carrying lever 35. Hence, so long as a segment lever 16 is in a position other than its normal position, and notwithstanding a release of the escapement member 30 by either one or the other of the releasing detents, the carrying cam is prevented from making a carrying throw to lift the carrying lever 35 until the detaining latch tooth of the detent 38 is again moved out of engagement with a stop of the escapement member 30 by a return to normal of the segment lever 16 of the next higher order.

It is thus provided that keys may be depressed simultaneously and segment lever impulses delivered in two or more adjacent orders, and yet any carrying impulses released from a lower one of said orders will not be actually delivered to the next higher of said orders until the segment lever movement of such higher order is complete. The operation of permitting simultaneous key-driven actuation of a plurality of segment levers in adjacent orders, the strokes overlapping each other in any manner, is the action that has hereinbefore been referred to as "duplexing."

This is, in brief outline, the manner in which the prime actuations and carrying impulses are imparted to the accumulator mechanisms in the duplex "Comptometers" of the above mentioned patents. It will also be understood that these actuating mechanisms are associated with various stop mechanisms. All of these stop mechanims are shifted variously into and out of their stop positions to impose additional restrictions to the movement of the carrying devices and to the prime actuations of the accumulators.

There is also provided a cancelling or zeroizing mechanism for clearing the machine or cancelling, that is, for returning the registering wheels and other parts to the zero positions, and, broadly stated, this zeroizing operation is accomplished by disconnecting the connections between the registering wheels 26 and the actuating devices, so that, while retaining the various above mentioned stop devices in their normal relations to the accumulator mechanisms, the stored power in the carrying springs 29 may give to the numeral wheels 26 backward rotations to move them rearwardly from the divers positions that they may occupy, and to stop them when they arrive individually at zero position. In the present instance, such cancelling is effected by detraining or disengaging the carrying spring winding gears 28 from the gearing on the shaft 21. A more complete description and disclosure of the above mentioned operation and parts will be found in the United States patents hereinbefore mentioned.

Figure 8:
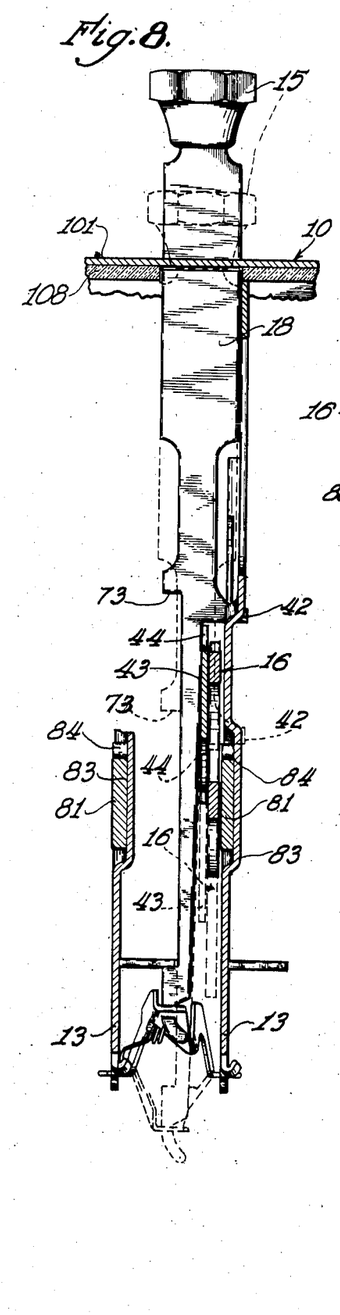
Fig. 8 is a sectional view taken substantially on line 8—8 in Fig. 3 which illustrates more clearly certain of the improvements.
Figure 11:
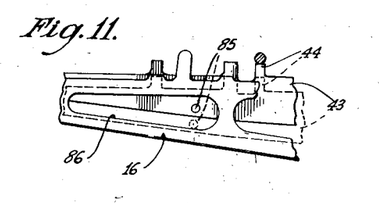
Fig. 11 is a detail elevational view of part of the key-lock and segment levers.

Reference is now had to the locks for the accumulator mechanism and the keys 15. A hook 41 (Fig. 3) is formed on each segment lever 16 which engages corresponding swinging hooks (not shown) pivoted on a cross rod fixed in the frame. The key stem 18 engages the top of the segment lever 16 by a shoulder or projection 42 (Fig. 8). The key 15, therefore, cannot be operatively depressed until the swinging hooks have been swung forward out from under the actuator hook 41. A lock lever 43 is arranged at the side of each of the segment levers 16 and pivoted at 17, which forms the pivot for all of the segment levers. This lock lever 43 has a number of protuberances 44 formed on its upper edge and adapted to be engaged by the shoulder 42 of the key stem 18, so that, when a key 15 is sufficiently depressed, the lock lever 43 is depressed in advance of the segment lever 16 (Fig. 11). The lock lever 43 is further provided with a downwardly extending projection 45 which rests on the forwardly extending arm 46 of an elbow lever 47 pivoted at 48 (Figs. 2 and 3) on the segment lever 16. The elbow lever 47 has an inner vertical arm which is connected by a spring 49 to the segment lever 16 so that the elbow lever 47 is normally pulled back into vertical position with its horizontal arm bearing up against the lock lever projection 45. The elbow lever 47 also has an outer vertical arm 50 which is pivotally connected at 51 to a forwardly extending arm or link 52. A horizontal slot 53 is formed in the link 52 which allows a slight forward and backward yielding of the parts, the rear end of the slot 53 being normally pulled closely against the pivot by a spring 54 extending between the upper ends of the levers 50 and 52.

When the lock lever 43 is depressed by the key shoulder 42 (Fig. 2), the projection 45 and arm 46 cause the arm 50 of the elbow lever 47 to rock forward on the segment lever and thrust forward the link 52 yieldingly through a pull on the spring 54. This link 52 is connected by a pivot 55 (Fig. 2) with a pair of forwardly and backwardly swinging links 56 which are pivotally supported on the frame and are limited in movement by a fixed cross rod 57 which rests in a notch 58 in the arm 59 of the swinging links 56. The links carry a pin which extends outwardly at the rear side of the swinging actuator hook (not shown), so that the forward thrust of the link 52 disengages such hook from the corresponding actuator hook 41. When such disengagement occurs in the column in which the depression of a key has been properly begun, the segment lever of that column is free to be depressed when its top edge is encountered by the lateral shoulder or projection 42 on the key stem 18, and the key 15 and stem 18 are free to follow the segment lever 16 downwardly.

Depression of a key lock lever 43, through the agency of the associated arm 52, also functions to lock the accumulator mechanism of that denominational order throughout the downward movement of the segment lever 16, since additive actuation of the accumulator only occurs upon upward movement of the segment lever. To accomplish this result, the following mechanism is provided.

The pin 55 carries a forwardly and backwardly, and upwardly and downwardly movable part, such as a lever 61 pivoted thereon between the links 56, the links being yieldingly pressed backward, and the forward arm of the lever 61 upward by a spring 62 which connects said parts. The forward end of the lever 61 is also pressed upward by a spring 63 which unites it with the fixed cross rod 57. The forward end of the lever 61 is provided with a pin 64 which enters the slotted arm 65 of an accumulator locking hook 66 pivoted on a fixed cross pivot rod 67, the arrangement being such that the upward and downward movement of the front arm of the lever 61 and the arm 65 of the detent will respectively engage and disengage the locking hook 66 with and from the lantern wheel 23 or an equivalent engageable part of the accumulator mechanism. When the said locking hook 66 engages the lantern wheel 23 the accumulator mechanism is locked against rotation, and it is necessary to remove the detent when and as the additive function of the actuator is performed.

In order to perform this releasing function, a pair of stop levers 71 and 72 (Fig. 2) are provided in each denominational order of the machine to be actuated by any one of the associated keys 15 near the end of their downward movement through the agency of a laterally extending shoulder 73 (Figs. 2 and 8) formed on the key stem 18. The stop levers 71 and 72 are so formed that the even numbered keys actuate the former and the odd numbered keys move the latter. The forward ends of the stop levers 71 and 72 are adapted to engage and swing downwardly pivoted levers 74 and 75, respectively (Fig. 2), at the end of their downward movement by a selected key 15. The downwardly movable ends of the levers 74 and 75 are provided with laterally extending lugs 76 and 77, respectively, which are adapted to impinge against the lever 61 to lower its forward end to raise the detent 66 out of locking engagement with the accumulator mechanism, thus permitting rotation of the latter upon upward movement of the segment lever 16.

The detent 66 is maintained in this raised or non-locking position until after upward movement of the segment lever 16 has been completed in the following manner. The rear end of the lever 61 is provided with a horizontally extending lug 161 which, in the normal position of the parts as shown in Fig. 2, is disposed slightly below the horizontal shelf portion of a hook-nosed latching pawl 162 pivoted on a transverse shaft 163. The lever 61 is moved forwardly upon depression of a key 15 by the forward movement of the link 52, in the manner hereinbefore described, causing the lug 161 to swing the pawl 162 in a counter-clockwise direction (viewing Fig. 2) on its pivot 163. Actuation of the associated stop lever 71 or 72 near the end of the downward movement of the key 15 in causing the lowering of the forward end of the lever 61 to raise the detent 66, through the agency of the lever 74 or 75 as above described, also raises the rear end of the lever 61 and its lug 161. Such upward movement of the lug 161 carries the same above the horizontal shelf portion of the pawl 162 to permit the pawl to swing back to its normal position of Fig. 2 to engage beneath the lug 161 and latch the lever 61 in raised position. After the upward movement of the segment lever 16 is completed, the lock lever 43 moves further upwardly relative thereto to permit the spring 49 to return the elbow lever 47, 50 to its normal position of Fig. 2, which pulls the link 52 and lever 61 rearwardly to their normal positions to disengage the lug 161 from the latching pawl 162. The springs 62 and 63 then raise the forward end of the lever 61 and the pin 64 to re-engage the detent 66 with the lantern wheel 23.

In addition to the above recited releasing functions of the stop levers 71 and 72, these levers are adapted to arrest the momentum of the keys 15 and segment levers 16 in their downward movements. As has been stated, the stop lever 71 or the lever 72 is swung downwardly by the selected key during the final portion of the key stroke. In this movement, the associated lever 74 or 75 is also swung downwardly, as explained above. The lever 75 is provided with a downwardly extending arm 78 (Fig. 2), and the lever 74 is provided with a similar downwardly extending arm which is not shown but is disposed to the rear of the arm 78 in Figure 2. As the levers 74 or 75 are swung by the selected stop lever 71 or 72, these depending arms are swung forwardly. Each of these arms is provided adjacent its lower end with a laterally extending pin 79 which is adapted in such forward movement to engage one of a plurality of rearwardly extending teeth 80 formed integrally with the associated segment lever 16 to arrest downward movement of the latter.

The segment lever 16, the key lock lever 43, and the stop levers 71 and 72 have been lightened immeasurably in the instant machine by using a metal of light weight material, such as aluminum, for example, or the like. By using this light weight material instead of the usual hardened steel, the levers respond much more quickly to the movement of the keys, and require less effort on the part of the operator. The levers of suitable light weight material may be hardened by means of a chemical bath (known as the "anodic" treatment), but any other desired treatment may be used, which does not cause the metal to lose any of its well known properties except that the outer surfaces are made tough enough to withstand the constant pounding to which they are subject.

Figure 3:
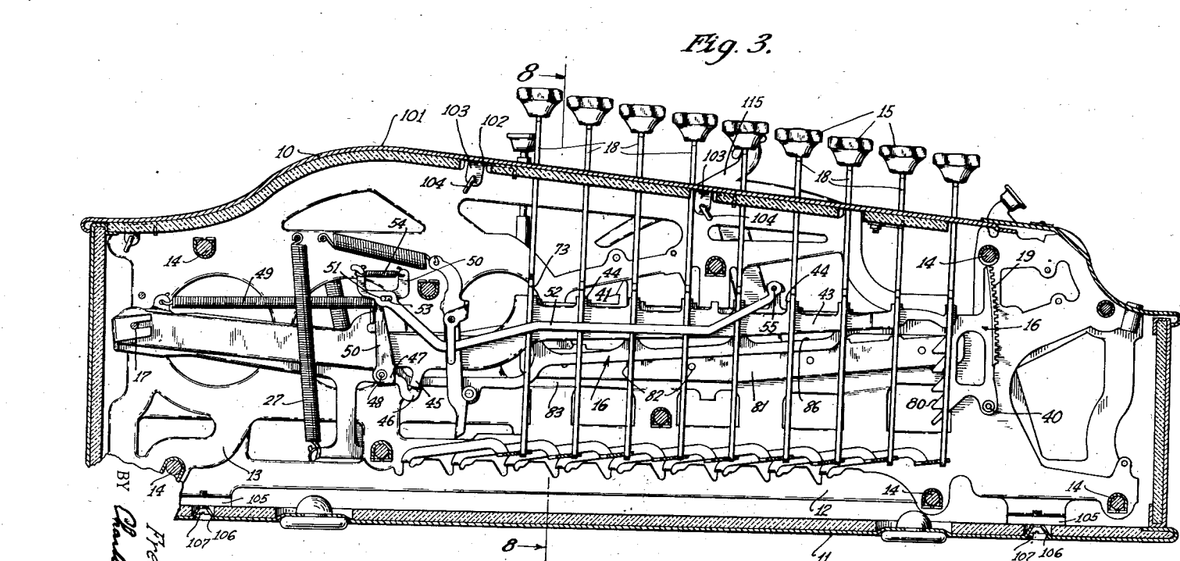
Fig. 3 is a vertical sectional view, similar to Fig. 2, having more of the movable parts removed therefrom.
Figures 4, 5:
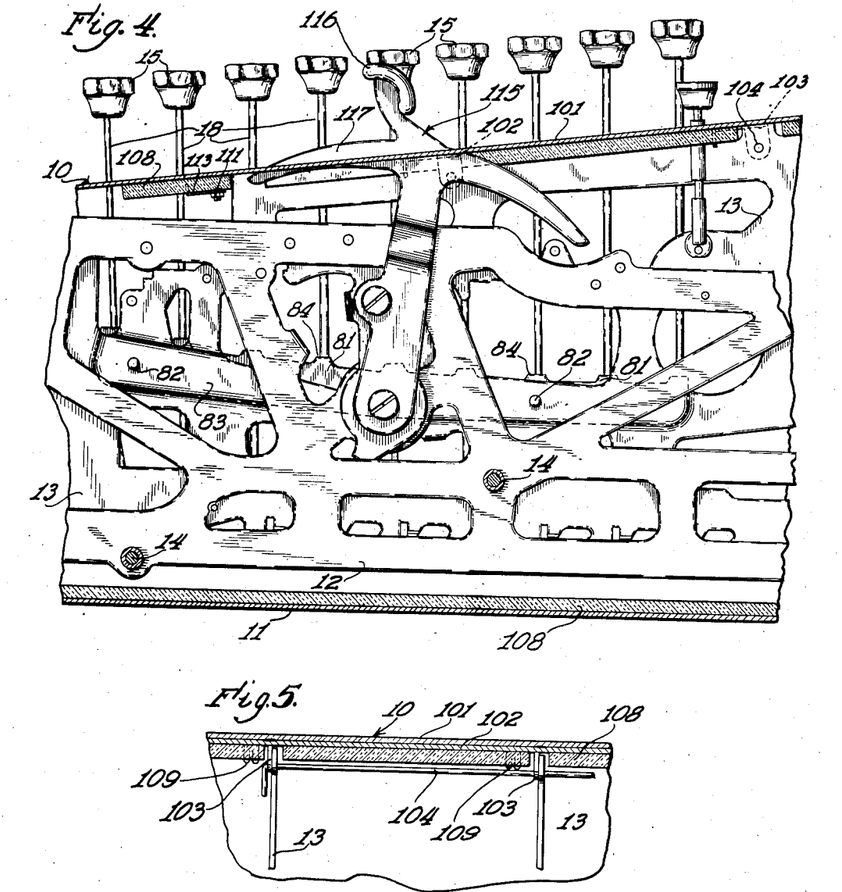
Fig. 4 is a vertical sectional view of the improved calculating machine taken substantially on the line 4—4 in Fig. 1, having some of the movable parts removed therefrom.
Fig. 5 is a detail sectional view of the fastening means used in making the casing therefor.
Figure 6:
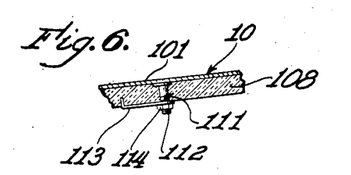
Fig. 6 is a detail sectional view of another fastening means.
Figure 7:
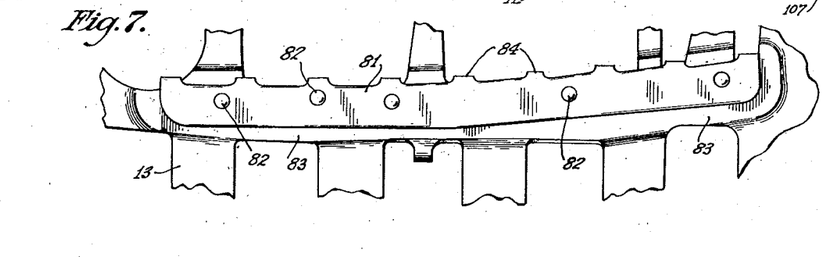
Fig. 7 is a detail elevational view illustrating the method of fastening the supplemental stop bar to the skeleton frame.

Since the segment levers 16, the key lock levers 43 and the stop levers 71 and 72 are made of light weight material, such as aluminum in the instant machine, a supplemental stop mechanism is provided herein for relieving these moving parts of the wear and strain caused by stopping their movements abruptly. This supplemental stop mechanism comprises a stop bar 81 fastened by means of rivets 82 upon an embossed section 83 of the skeleton frame members 13 in each denominational order of the machine (Figs. 3, 7 and 8). Each of the stop bars 81 is provided with a plurality of up-standing shoulders 84 which are disposed in the path of movement of the laterally extending shoulders 42 of the several key stems 18 of the associated denominational order of the machine. These stop bars 81 are preferably made of steel or other suitable material, and are engaged by the shoulder 42 of the stem 18 of the selected key 15 at the end of the downward movement of the latter. In this manner, all shock and strain resulting from the operation of the keys is prevented from being directly transmitted to the moving parts of the machine, and undue wear or flattening of the shoulders on the segment levers 16, key lock levers 43 and stop levers 71 and 72 is prevented and insures longer life and wear of these movable parts.

It will be noted from Figs. 3, 8 and 11 that the shoulders 44 on the lock lever 43 extend up higher in normal position than do the corresponding shoulders on the segment lever 16 which are engaged by the laterally extending shoulder 42 on the stem 12 of the key 15. Thus, in the depression of a key 15 the lock lever 43 will be moved for a short distance before the segment lever 16, and the two will then be moved simultaneously until the segment lever 16 is returned to normal position. In the calculating machines such as are illustrated by the above noted United States patents, there normally occurs upon the depression of the key lever an overthrow of the key lock lever. This overthrow is the result of the inertia imparted to the key lock lever brought about by the depression of the key moving the said key lock lever beyond that point to which it has been positively depressed by the said key. Thus it will be seen that the key lock lever by virtue of the overthrow and the resulting rebound of the said lever against the shoulder of the key will cause severe strain and excess wear to occur at the point of contact. In order to prevent rebounding of the lock lever 43, and to limit its movement relative to the segment lever 16 so as to relieve the shoulders 44 from a certain amount of strain and wear, a hardened pin 85 is inserted in the lock lever 43 and extends laterally through an associated recess 86 in the segment lever 16. In normal position of the parts, as shown, in full lines in Fig. 11, the pin 85 is out of engagement with the upper surface of the recess 86 and does not limit the upward movement of the lock lever 43 relative to the segment lever 16. In the lowermost position of the lock lever 43 relative to the segment lever 16, as shown in broken lines in Fig. 11, the pin 85 impinges against the lower surface of the recess 86 to limit downward movement of the lock lever 43 relative to the segment lever 16. Thus, whenever a digital key is depressed, initial operation thereof will move the associated lock lever 43 relative to the segment lever 16 until it reaches its broken line position of Fig. 11. For the remainder of the down stroke of the key, the lock lever 43 and the segment lever 16 will be moved together, the pin 85 and the lower surface of the recess 86 preventing any further downward movement of lever 43 relative to segment lever 16. Consequently, when downward movement of the segment lever 16 is arrested by the pin 79 of one of the levers 74 or 75 engaging one of the teeth 80, as has been described hereinbefore, any rebounding of the lock lever 43 will also be prevented.

Figure 12:
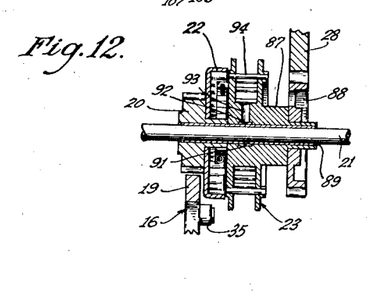
Fig. 12 is a sectional view taken substantially on line 12—12 in Fig. 9.

Referring now to Figs. 2, 9 and 12, the improved lantern gear assemblage employed in each denominational order of the accumulator will be described. The lantern gear 23 is provided with a laterally extending hub portion 87, upon which is mounted a gear 88 which is adapted to mesh with the carrying spring winding gear 28 and forms a part of the gear train to the associated numeral wheel 26. The accumulator pinion 20, the ratchet mechanism 22, lantern gear 23 and gear 88 comprise the lantern gear assemblage, and are mounted for rotation on a tube or sleeve 89 made of bronze or other suitable bearing material, which is rotatably supported by the shaft 21. The sleeve 89 is provided with an aperture or oil port 91 extending therethrough, which communicates with an annular recess 92 provided in the bore of the hub portion 87 of the lantern gear 23. A radial aperture or port 93 is provided through the hub portion 87 of the lantern gear 23 which communicates with the recess 92 and through which oil may be supplied to the port 91 and the bore of the sleeve 89. With this arrangement of the parts, friction is decreased to such a point that free rotation of the lantern gear assemblage is insured.

To further lighten the key stroke of the machine, lantern gear 23 and gear 88 are made of aluminum, or other suitable light weight material, preferably chemically treated in the same manner as the segment levers, key lock levers and stop levers. The pins 94 of the lantern gear 23, however, are made of steel due to their extremely small size.

It will thus be apparent that the use of any suitable light weight material, such as aluminum, in the moving parts wherever possible, the provision of an improved bearing for the lantern gear assemblage and the use of an improved motor spring which is uniformly tensioned regardless of the varying digital degree of winding imparted thereto have resulted in appreciably lightening the key stroke, while increasing the life and durability of the moving parts and reducing the amount of noise attendant with their operation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a key driven calculating machine, an accumulator, a segment lever for imparting digital degrees of actuation to said accumulator, a key lock lever, depressable keys for differentially operating said segment lever and said key lock lever, means controlled by said keys for limiting the movement of said segment lever to the selected digital degree of actuation, and means on said key lock lever coacting with said segment lever to prevent the movement of the key lock lever beyond the position to which it is positively moved by depression of a key whereby overthrow and resultant rebound of the key lock lever are prevented.

2. In a key driven calculating machine, an accumulator, a segment lever for imparting digital degrees of actuation to said accumulator, a key lock lever, depressable keys for differentially operating said segment lever and said key lock lever, means controlled by said keys for limiting the movement of the segment lever to the selected digital degree of actuation, and pin and slot means on said segment and key lock levers to prevent the movement of the key lock lever beyond the position to which it is positively moved by depression of a key, whereby overthrow and resultant rebound of the key lock lever are prevented.

3. In a key driven calculating machine, an actuator, a segment lever for imparting digital actuation to said actuator, a key lock lever, depressible keys for differentially operating said segment lever and said key lock lever, means controlled by said keys for limiting the movement of the segment lever to the selected digital degree of actuation, and means comprising an element mounted on one of said levers and coacting with the other of said levers whereby overthrow and resultant rebound of the key lock lever are prevented.

FREDERICK A. NIEMANN.